(12) United States Patent
Morbey et al.

(10) Patent No.: US 8,126,214 B2
(45) Date of Patent: Feb. 28, 2012

(54) PROCESS AND APPARATUS FOR ANNOTATING ELECTRONIC MAP DATA

(75) Inventors: Joao Morbey, Toulouse (FR); Mathieu Landman, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 868 days.

(21) Appl. No.: 12/190,977

(22) Filed: Aug. 13, 2008

(65) Prior Publication Data
US 2009/0052806 A1 Feb. 26, 2009

(30) Foreign Application Priority Data
Aug. 21, 2007 (FR) ...................................... 07 57121

(51) Int. Cl.
*G06T 3/00* (2006.01)
(52) U.S. Cl. ........................................ 382/113; 382/293
(58) Field of Classification Search .................. 382/113, 382/276, 293, 302
See application file for complete search history.

(56) References Cited

U.S. PATENT DOCUMENTS

| 5,214,757 A | * | 5/1993 | Mauney et al. | 715/751 |
| 2005/0034062 A1 | * | 2/2005 | Bufkin et al. | 715/512 |
| 2008/0059889 A1 | * | 3/2008 | Parker et al. | 715/748 |

FOREIGN PATENT DOCUMENTS
EP 1 830 159 A1 9/2007
* cited by examiner

*Primary Examiner* — Jon Chang
(74) *Attorney, Agent, or Firm* — Oblon, Spivak, McClelland, Maier & Neustadt, L.L.P.

(57) ABSTRACT

The invention relates to a method and a device for annotating electronic background maps adapted in particular to navigation aid systems for vehicles. Projection parameters and geodesic parameters are associated with the said background map. Display references are associated with the display of at least part of the said background map. After at least one annotation has been acquired, it is displayed on the said background map. The said at least one annotation is then transformed to at least one vectorial object characterized by at least one point having geometric coordinates defined in the display system of the said at least one annotation and of the said background map. The said geometric coordinates of the said at least one point of the said at least one vectorial object are then converted to geographic coordinates according to the said projection parameters and the said geodesic parameters associated with the said background map and according to the said display references.

18 Claims, 4 Drawing Sheets

Background Art

PROCESS AND APPARATUS FOR ANNOTATING ELECTRONIC MAP DATA

BACKGROUND

The present invention relates to the field of cartography and more particularly to a method and a device for annotating electronic background maps adapted in particular to navigation aid devices for vehicles.

Traditionally, aircraft crews and the ground preparation staff use paper maps on which annotations are made in handwriting. Such annotations relate, for example, to flight indications, especially of highways or of air corridors, as well as to tactical information items in the case of military flights.

FIG. 1 illustrates an example of an annotated paper map 100 formed from a background map 105 and annotations 110.

Furthermore, there exist electronic navigation aid devices making it possible to display electronic background maps.

Two formats typically exist for electronically representing a map. A first format corresponds to a paper photograph of the maps, and moreover it often relates to paper maps that have been digitized. According to this format, the electronic map can be considered as an image or as a matrix whose abscissas and ordinates represent geographic coordinates, in latitude and longitude, for example, and whose value represents a color, or in other words an information item about the nature of the point, such as a topological indication. The indications given by the map, such as a place name, are represented in the same way, by a set of color points. Electronic maps using this format are generally known as raster maps in English terminology.

According to a second format, a description of the map is used to generate the map or a part of the map when this is used. Such a description comprises a geometric description of elements of the map. Thus, unlike the first format, a highway is characterized not by a set of points of the same color but by a set of geometric elements such as vectors and circular arcs. The indications given by the map are also represented in descriptive form, for example in the form of lists comprising pairs of geographic position and character strings. The electronic maps using this format are generally known as vector maps.

An advantage of vector maps over raster maps lies in the density of information items that can be stored in memory, or in other words in the number of information items that can be stored in memory for a given storage capacity, as well as in the simplicity of certain processing operations, such as the choice of density of viewed information items.

The raster maps are generally obtained directly from existing paper maps. They are determined for a given scale. For example, 1:50,000 and 1:250,000 maps exist. The choice of scale is determined by the density of desired information items.

Furthermore, the raster maps are recorded with a precision defined during digitization. Thus it is possible to determine the resolution of each map point, also known as pixel (acronym for Picture Element in English terminology), or in other words the length represented by this point. The resolution of a pixel is the ratio of the map scale to the resolution of the digitization. When a raster map is displayed on a screen, it is possible to change the viewing scale by using standard image-processing functions such as interpolation.

Navigation aid devices are generally centralized devices adapted to select the map to be displayed, typically a map of raster type, and to determine the display resolution and the position of the map relative to the screen. The selected map can be displayed in real time on a navigation screen, thus forming a background map on which supplementary information items can be displayed by superposition. Such supplementary information items are, for example, points of interest, known as waypoints in English terminology. All of the calculations necessary for addition of these information items are often implemented in the navigation aid devices.

However, although the navigation aid devices furnish useful information items to the users in real time, they do not permit manual annotation of the displayed background maps.

SUMMARY

The invention makes it possible to overcome at least one of the problems mentioned in the foregoing.

The invention therefore has as an object a method for annotating an electronic background map, projection parameters and geodesic parameters being associated with the said background map, display references being associated with the display of at least part of the said background map, this method comprising the following steps, acquisition of at least one annotation, the said at least one annotation being displayed on the said background map;

transformation of the said at least one annotation to at least one object characterized by at least one point having geometric coordinates defined in the display system of the said at least one annotation and of the said background map; and conversion of the said geometric coordinates of the said at least one point of the said at least one object to geographic coordinates according to the said projection parameters and the said geodesic parameters associated with the said background map and according to the said display references.

The method according to the invention therefore permits geo-referencing of annotations. In this way the geo-referenced annotations can in particular be subsequently used and/or transferred to a different background map with or without change of cartographic parameters.

According to a particular embodiment, the said transformation step comprises a step of transformation of the said at least one object to at least one vectorial object that can be easily manipulated.

The said at least one annotation preferably belongs to a specific graphic layer of the display system of the said at least one annotation and of the said background map. Similarly, the said at least one part of the said background map preferably belongs to a graphic layer separate from the said specific graphic layer comprising the said at least one annotation. The use of separate graphic layers therefore makes it possible to simplify the management and display of different data.

According to a particular embodiment, the method additionally comprises a step of storage in memory of the said at least one object and of the said associated geographic coordinates.

The invention also has as an object a computer program comprising instructions adapted to the implementation of each of the steps of the method described in the foregoing.

The invention also has as an object a device for annotating an electronic background map, projection parameters and geodesic parameters being associated with the said background map, display references being associated with the display of at least part of the said background map, this device comprising the following means, means for acquiring at least one annotation;

means for displaying the said at least one annotation and at least part of the said background map;

means for transforming the said at least one annotation to at least one object characterized by at least one point having geometric coordinates defined in the display system of the said display means; and means for converting the said geometric coordinates of the said at least one point of the said at least one object to geographic coordinates according to the said projection parameters and the said geodesic parameters associated with the said background map and according to the said display references.

The device according to the invention therefore permits geo-referencing of annotations, which can in particular be subsequently used and/or transferred to a different background map with or without change of cartographic parameters.

According to a particular embodiment, the device additionally comprises storage means adapted to store in memory the said at least one object and the said associated geographic coordinates.

Advantageously, the said transformation means comprise means for transforming the said at least one object to at least one vectorial object that can be easily manipulated.

The said display means preferably comprise means for managing graphic layers, the said at least one annotation belonging to a specific graphic layer of the said display means and the said at least one part of the said background map belonging to a graphic layer separate from the said specific graphic layer comprising the said at least one annotation. The use of separate graphic layers therefore makes it possible to simplify the management and display of different data.

The invention also has as an object an aircraft comprising the device described in the foregoing.

BRIEF DESCRIPTION OF THE SEVERAL VIEWS OF THE DRAWINGS

Other advantages, objectives and characteristics of the present invention will become evident from the following detailed description, written by way of non-limitative example with reference to the attached drawings, wherein.

DETAILED DESCRIPTION

Figure 1:
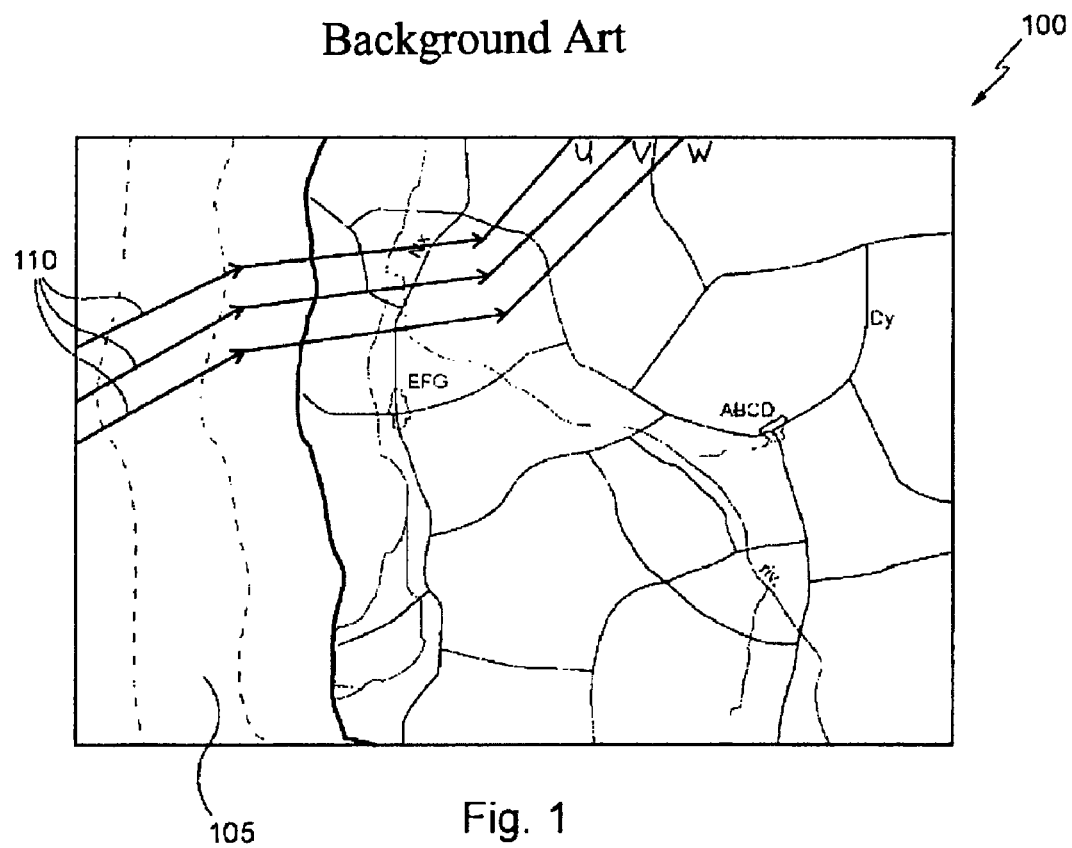
FIG. 1 illustrates an example of an annotated map.

The invention makes it possible in particular to introduce, into an electronic format that can be interpreted by cartographic generators, handwritten annotations of maps produced by the users and pilots. Advantageously, these annotations are automatically geo-referenced so as to be recorded and if necessary reproduced on other electronic background maps.

In general, the solution consists in particular of defining, during a preparation process on the ground or in flight, annotations in graphical manner by superposing a geo-referenced electronic map of vectorial or raster type.

The device is provided with a system for viewing electronic maps, an interactive graphical tool making it possible to undertake manual annotations on the unit for viewing electronic maps, and a vectorial conversion and geo-referencing device.

The invention is advantageously implemented according to a decentralized mode, or in other words the device making it possible to undertake manual annotations, to convert these data and to geo-reference them is independent of the device for constructing the background map and of the display device.

It is appropriate initially to recall that, because of the complex shape of the earth, it is not possible faithfully to transpose geographic data of the earth into a planar cartographic representation. It is therefore necessary to determine a cartographic projection in order to transpose geographic data related to the earth's surface into a planar cartographic representation. In simplified manner, the cartographic projection is defined relative to an ellipsoid representing the earth as well as by positioning parameters of this ellipsoid that are known as the geodesic datum.

There exist several types of cartographic projections, including the equivalent projection, which locally conserves areas, the conformal projection, which locally conserves the angles (and therefore the shapes) and the aphylactic projection, which is neither conformal nor equivalent but can be equidistant, or in other words can conserve the distances along the meridians.

From a mathematical viewpoint, the cartographic projections can be classified into three families: the cylindric projections, the conic projections and the azimuthal projections.

According to the cylindric projection, the ellipsoid is projected onto a cylinder that includes it, this cylinder being able to be tangential to a circle such as the equator or secantial in two circles such as lines of latitude or any other circle formed by the intersection of the ellipsoid with a plane. After projection, the cylinder is developed to obtain a map. Depending on the type of cylindric projection, the projection may be equivalent, conformal or aphylactic. Similarly, in a conic projection, the ellipsoid is projected onto a cone.

According to the azimuthal projection, the ellipsoid is projected onto a plane, such as a plane tangential to one point of the ellipsoid. Depending on the position of the perspective point used for the projection, the projection may be stereographic, gnomonic or orthographic. In an orthographic azimuthal projection, the perspective point is at infinite distance. The areas and shapes are then deformed, but the distances are preserved along the lines of latitude. Furthermore, depending on the position of the tangent plane, the azimuthal projection is said to be polar (tangent plane at a pole), equatorial (tangent plane at a point of the equator) or oblique (tangent plane at another point).

Thus the parameters are associated with the background map displayed on a viewing device of a navigation aid device. These parameters represent in particular the projection, the geodesic datum and the resolution.

The method and the device according to the invention are adapted to use at least certain of these parameters of the background map to geo-reference the annotations made on the display device.

Figure 2:
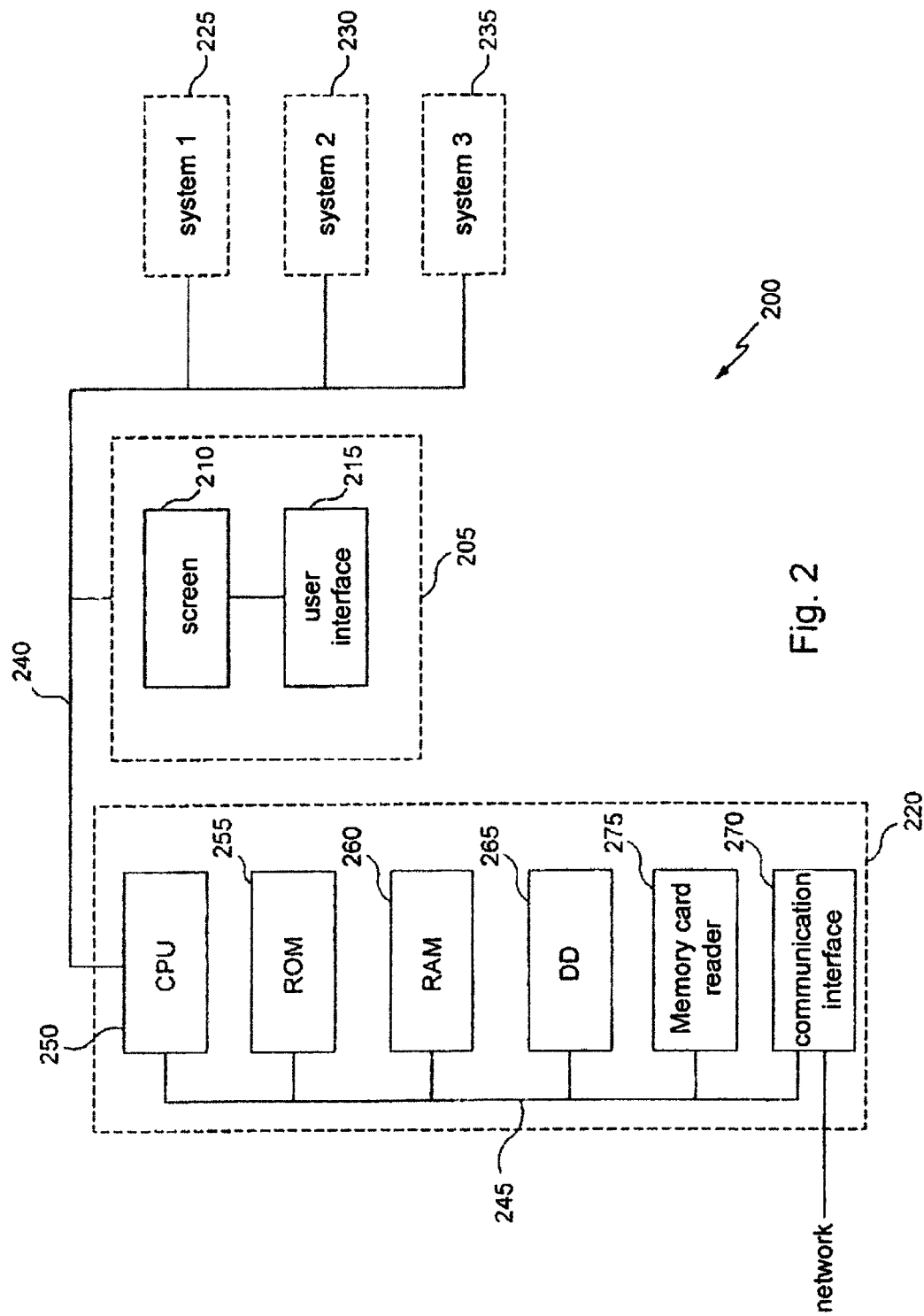
FIG. 2 illustrates an example of a navigation aid device adapted to implement the invention.

FIG. 2 illustrates an example of navigation aid device 200 adapted to implement the invention. As shown, device 200 is provided with a device 205, which itself comprises a display device 210 and a user interface 215. The display device is preferably a screen such as a TFT LCD screen (initials for Thin-Film Transistor and Liquid Crystal Display respectively in English terminology). User interface 215 may be independent of the display device, for example a keyboard and/or a mouse, or integrated in the display device, for example in the form of a touch screen. The user interface can be used in particular to enter a reference point of the map to be displayed, such as the center thereof or a particular position, such as the position of the vehicle on the display device, as well as the display coverage, or in other words the geographic zone of the earth covered by the background map.

The user interface is additionally adapted to enter viewed information items directly on the display device, in relation with a displayed background map. According to a particular embodiment, this user interface is similar to that of a drawing software program and makes it possible in particular to draw objects such as lines, curves and arcs of circles and to reproduce character strings at precise locations of the display device.

The nature of the annotations can therefore be defined in standard manner by selecting a virtual tool, such as a "line" tool, a "pencil" tool, a "circular arc" tool or a "character" tool.

The locations of the display device where the objects and/or character strings are to be displayed can be defined, for example, by means of a visual cursor moved by directional keys, a mouse or a similar device. Alternatively, these locations can be defined directly by pressing on these locations when a display device of the touch screen type is used.

Advantageously, the annotations are defined in a graphic layer, also known as an overlay, independent of the graphic layer or layers in which there are defined the background map and the supplementary data that may be displayed.

Navigation aid device 200 is also provided with a processing device 220 according to the invention, in order to process, preferably in real time, the annotations made on a displayed background map, with a device 225 for constructing background maps, a device 230 for management of navigation information items and a device 235 for management of tactical information items. Devices 230 and 235 are not necessary to the implementation of the invention. Furthermore, these devices may or may not be activated, independently. It is also possible to add other similar systems for furnishing other types of geo-referenced information items to display device 210, in order that these information items will be superposed on the displayed background map. The geo-referenced information items can be displayed systematically or displayed at the user's request, for example according to their nature or their type.

Devices 220 to 235 are connected to device 205 by a communication bus 240, for example a connection of Ethernet type such as AFDX. Devices 220 to 235 are therefore capable of receiving, from user interface 215 or from another device, a reference point and a coverage permitting them to construct the graphical background and to determine the position of geo-referenced information items to be displayed. As an example, the reference point is the position, expressed in latitude and longitude, of the aircraft on board which such a navigation aid device is installed. The coverage is, for example, the distance in nautical miles between the extreme points of the display device. The reference point preferably corresponds to a fixed point of the display device.

Communication bus 240 is also adapted to transmit the graphic layer containing the annotations of the display device or of the user interface to processing device 220.

Processing device 220 is provided with a communication bus 245, to which there are connected:

- a central processing unit or microprocessor 250 (CPU, Central Processing Unit);
- a non-volatile memory 255 (ROM, Read Only Memory), which may contain programs for processing annotations; and
- a volatile memory or cache memory 260 (RAM, Random Access Memory), containing registers adapted to record the variables and parameters, such as annotations, created and modified during execution of the aforesaid programs.

As an option, processing device 220 may also be provided with:

- a hard disk 265, which can contain the aforesaid programs, processed data or data to be processed according to the invention, as well as annotations;
- a communication interface 270 connected to a distributed communication network, such as the AFDX network, different from that represented by communication bus 240, the interface being able to transmit and receive data; and
- a memory card reader 275 adapted to read or write therein processed data or data to be processed according to the invention as well as annotations.

The communication bus permits communication and interoperability between the different elements included in processing device 220 or connected thereto. The representation of the bus is not limitative and, in particular, the central unit is capable of communicating instructions to any element of processing device 220 directly or by way of another element of processing device 220.

The executable code of each program permitting the programmable apparatus to implement the processes according to the invention may be stored, for example, in hard disk 265 or in read-only memory 255.

According to a variant, the executable code of the programs will be capable of being received by way of the communication network, via interface 270, so as to be stored in a manner identical to that described in the foregoing.

The memory cards may be replaced by any information medium such as, for example, a compact disk (CD ROM). In general, the memory cards can be replaced by information storage means that can be read by a computer or by a microprocessor, integrated or not integrated with the apparatus, possibly removable, and adapted to store in memory one or more programs whose execution permits implementation of the method according to the invention as well as the annotations entered by a user.

More generally, it will be possible to load the program or programs into one of the storage means of processing device 220 before executing them.

Central unit 250 will command and direct the execution of instructions or portions of software code of the program or programs according to the invention, which instructions are stored in hard disk 265 or in read-only memory 255 or else in the other aforesaid storage elements. When the power is turned on, the program or programs stored in a non-volatile memory, such as hard disk 265 or read-only memory 255, are transferred into random-access memory 260, which then contains the executable code of the program or programs according to the invention as well as the registers for storage in memory of the variables and parameters necessary for implementation of the invention.

It should be noted that the communication apparatus provided with processing device 220 may also be a programmed apparatus. This apparatus then contains the code of the information-processing program or programs fixed, for example, in an application-specific integrated circuit (ASIC).

Figure 3:
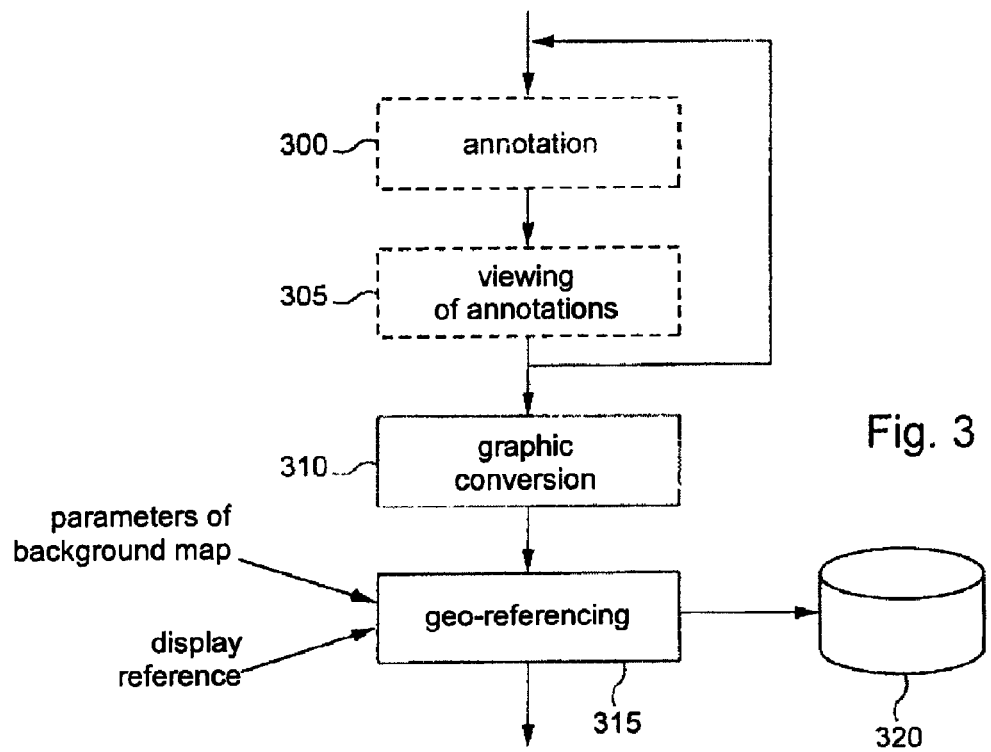
FIG. 3 illustrates certain steps of the method of the invention for annotating a background map.

FIG. 3 illustrates certain steps of the method of the invention for annotating a background map. According to a particular embodiment, the steps represented by the dashed-line blocks are implemented in display device 210 or in user interface 215, while the steps represented by the solid-line blocks are implemented in processing device 220.

A first step 300 consists in acquiring the annotations by means of user interface 215. As indicated in the foregoing, these annotations are preferably stored in memory in a particular graphic layer that is displayed in real time (step 305) superposed on the other graphic layers used, in particular containing the background map and possible supplementary data.

The graphic layer containing the annotations is transmitted to processing device 220.

Figure 4:
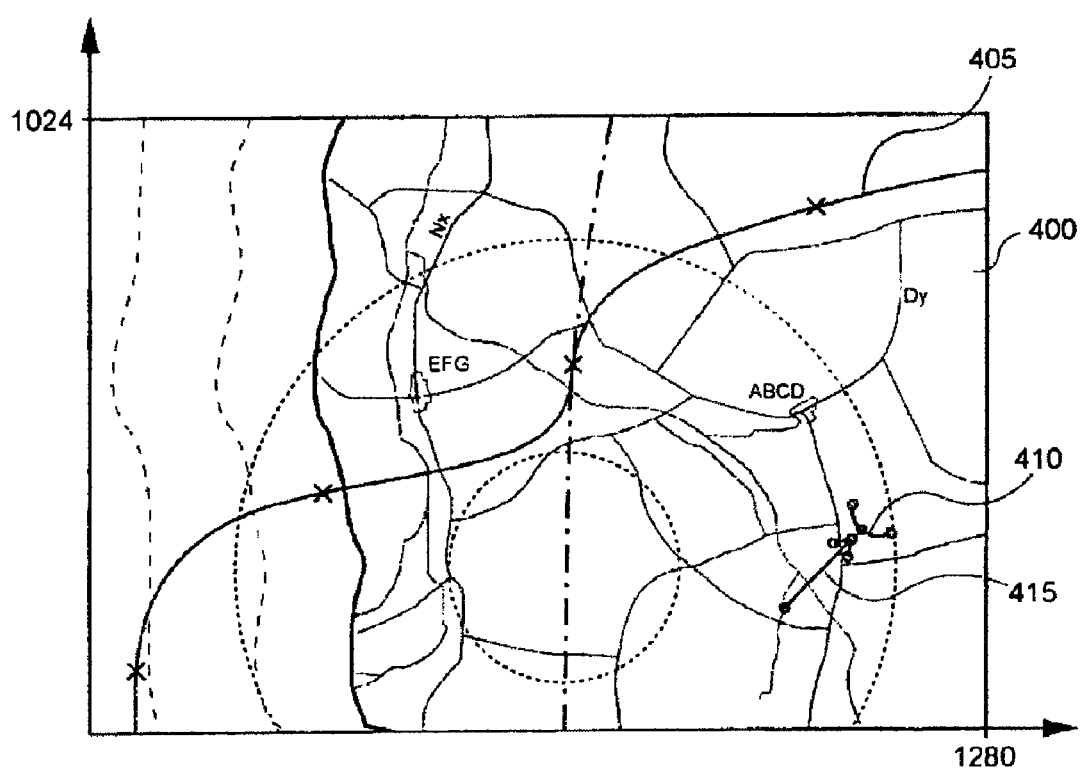
FIG. 4 represents a display device on which there appear a background map, supplementary data and annotations.

In a subsequent step (step 310), the annotations are converted to elemental vectorial objects, or in other words, for example, to segments and arcs of circles, as illustrated in FIG. 4. This geometric conversion is advantageously automatic and uses standard conversion functions.

FIG. 4 represents a display device on which there appear a background map 400, supplementary data 405 and annotations. In this case the annotations consist of an arc of a circle 410 and of an arrow 415. As illustrated, arc of a circle 410 constitutes a vectorial object defined by three points (the end points and a tangency point) while arrow 415 is formed by three vectorial objects, in this case three vectors each formed by two points. By way of illustration, the display device is in SXGA format (initials for Super eXtended Graphics Array in English terminology), or in other words the displayed image is formed by a matrix of 1280 by 1024 pixels.

Each reference point of the vectorial objects is identified by these display coordinates, or in other words by its position, in pixels, on the display device.

This geometric conversion makes it possible to obtain a list such as the following list, which represents the vectorial objects illustrated in FIG. 4, defined for a particular background map, at a given moment and for a given user, Background map xx of dd/mm/yyyy for user yy
vector
(812, 238)-(990, 369)
(935, 369)-(990, 369)
(990, 333)-(990, 369)
arc of a circle
(1004, 440)-(1032, 381)-(1125, 392)

It is advisable to note that the values given in this list are illustrative and have no meaning in themselves.

During conversion of annotations, all the annotations are converted, and they replace the previously identified annotations or, alternatively, a status is associated with each annotation to determine whether it has been previously converted and stored in memory. In the second case, a test is preferably applied to determine whether annotations have been suppressed, and, if so, to delete these annotations from the database.

The geometric coordinates of characteristic points of vectorial objects corresponding to the annotations are then converted to geographic coordinates, such as latitude and longitude, according to the parameters associated with the background map and according to the display references. The parameters associated with the background map and the display references can be received in particular from display device 210 or from user interface 215.

The display references are, for example, the geographic position of a particular geometric point of the display device as well as the display coverage.

It should be noted that the parameters associated with the background map can be transmitted one time only, when a new background map is displayed. Similarly, the display references can be transmitted only when they change.

The conversion of geometric coordinates to geographic coordinates is achieved by the inverse transform of that used for conversion of geographic coordinates to geometric coordinates on the electronic map, taking into account a change of landmark related to the display references of the electronic map. Such functions are commonly used in navigation aid devices, especially for display of supplementary data on a background map.

The conversion of geometric coordinates to geographic coordinates makes it possible to obtain a new list of annotations, in which the vectorial objects are geo-referenced. For example, after conversion, the foregoing list can be written in the following form:

Annotations of dd/mm/yyyy for user yy
vector
(23°88.23'E, 39°66.66'N)-(29°11.76'E, 61°5'N)
(27°5'E, 61°5'N)-(29°11.76'E, 61°5'N)
(29°11.76'E, 55°5'N)-(29°11.76', 61°5'N)
arc of a circle
(29°52.29'E, 73°33.33'N)-(30°35.29'E, 63°5'N)-(1125, 65°33.33'N)

As in the foregoing, the values given in this list are illustrative and do not have any meaning in themselves.

It should be noted that, in the foregoing list, the references of the vectorial objects are defined in geographic coordinates, and so these references are independent of the map background and of its parameters.

This list of vectorial objects corresponding to annotations can be stored in a database 320 for subsequent use with the same background map or with another background map, which may or may not have other parameters. Since the annotations are geo-referenced, they can be added precisely at any time to any background map whatsoever (the coverage of which is sufficient). These annotations can be added in their entirety or independently of one another.

Alternatively, or in supplementary manner, the list of vectorial objects corresponding to annotations can be stored in memory in the background map itself.

Figure 5:
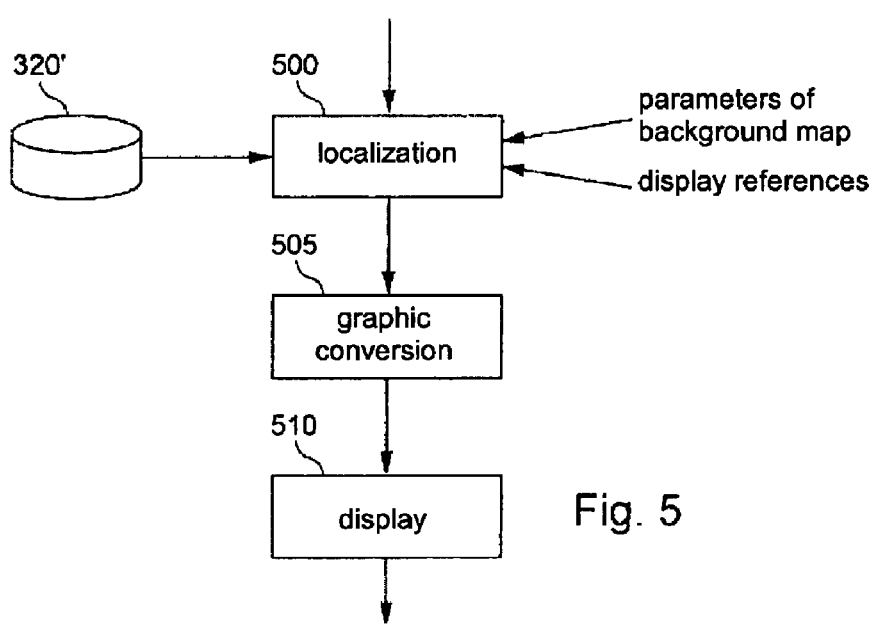
FIG. 5 illustrates a function for addition of previously recorded annotations to a background map.

FIG. 5 illustrates a function for addition of previously recorded annotations to a background map. This function is similar to those used by the navigation aid devices for displaying supplementary data on a background map.

The vectorial objects obtained from a database 320' are all converted at first (step 500) according to the parameters associated with the background map used and according to the display references, in order to convert the geographic coordinates to geometric coordinates of the frame of reference of the display device.

The vectorial objects are then represented on a specific graphic layer to form an image (step 505), which is then displayed (step 510).

Figure 6:
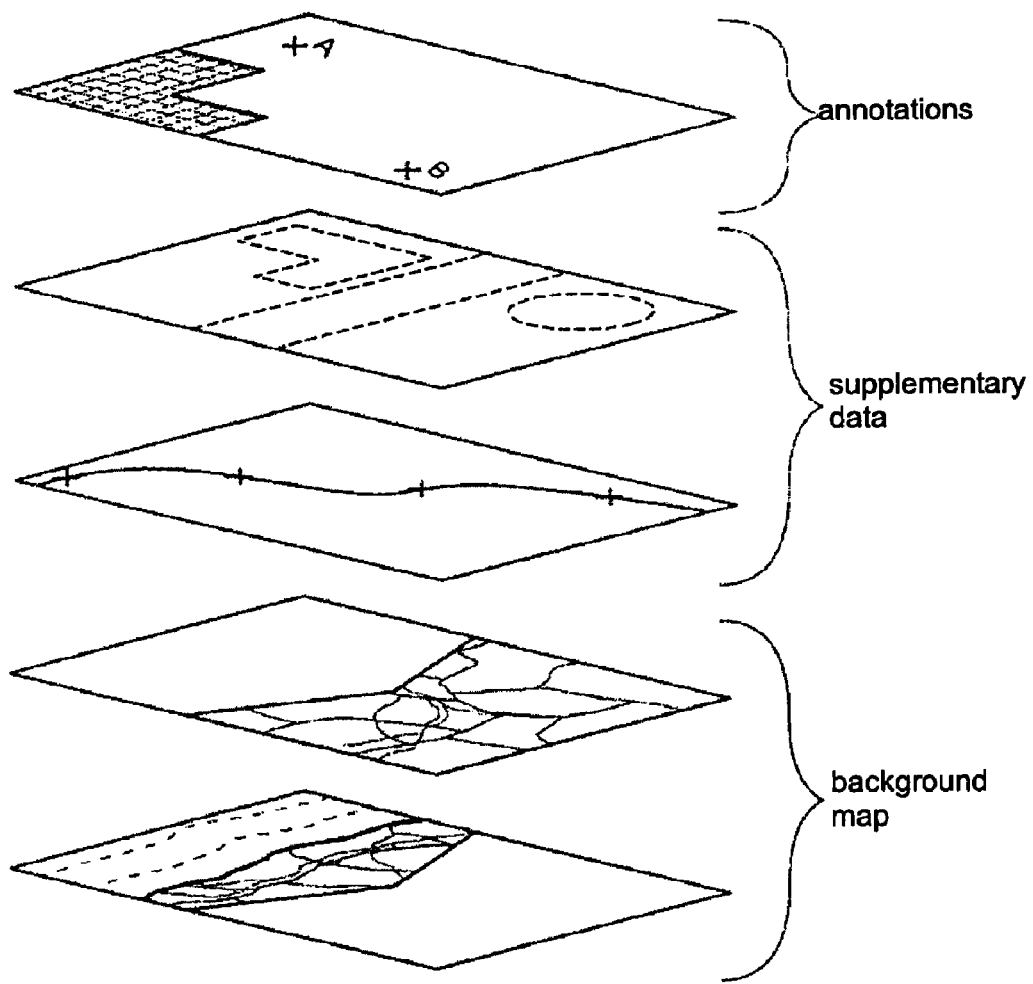
FIG. 6 illustrates an example of display, by graphic layers, of navigation information items composed of a background map, supplementary data and annotations.

FIG. 6 illustrates an example of display of navigation information items composed of a background map, of supplementary data and of annotations. In this case the supplementary data are data such as traffic data and tactical data or previously recorded annotations. As illustrated, the background map is composed of a plurality of graphic layers (the number of graphic layers being determined in this case by the number of electronic maps used to construct the background map). Similarly, the supplementary data are represented according to a plurality of graphic layers. For example, one graphic layer can be used to display tactical data and another graphic layer can be used to display traffic data. Finally, a graphic layer is used for the acquired annotations and the annotations in the course of being acquired. By addition or suppression of graphic layers, this display mode makes it possible easily to select which data are to be displayed. In addition, by the order in which the graphic layers are superposed, this display mode makes it possible to define the priority of data to be displayed.

Figure 7:
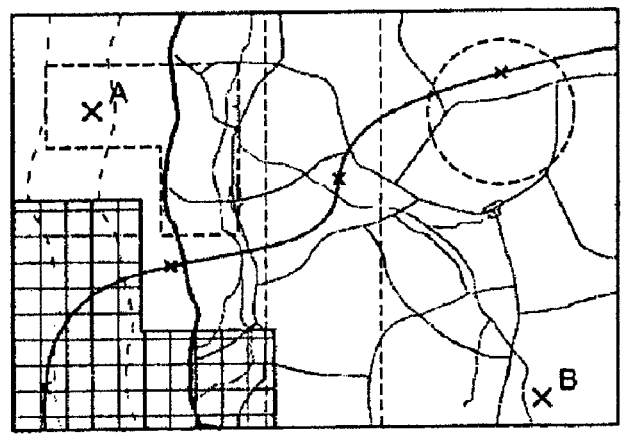
FIG. 7 represents the display of the graphic layers illustrated in FIG. 6.

FIG. 7 represents the display of the graphic layers illustrated in FIG. 6.

It should be noted that a plurality of graphic layers can be used to represent the annotations. In this way it is possible to distinguish, for example, the nature of the annotations according to the graphic layer to which they belong. This embodiment therefore makes it possible to distinguish the annotations, especially according to their nature, and thus to determine which types of annotation are to be displayed and/or stored in memory.

Naturally, a person competent in the field of the invention will be able to apply modifications to the foregoing description in order to satisfy specific needs.

The invention claimed is:

1. A method for annotating an electronic background map, the background map being associated with projection parameters and geodesic parameters, and display references being associated with a display of at least part of the background map, the method comprising:
   acquiring at least one annotation, the at least one annotation being displayed on the background map;
   transforming the at least one annotation to at least one object including at least one point having geometric coordinates defined in the display system of the at least one annotation and of the background map; and
   converting the geometric coordinates of the at least one point of the at least one object to geographic coordinates according to the projection parameters and the geodesic parameters associated with the background map and according to the display references.

2. The method according to claim 1, wherein the step of transforming includes transforming the at least one object to at least one vectorial object.

3. The method according to claim 1 or claim 2, wherein
   the at least one annotation belongs to a specific graphic layer of the display system of the at least one annotation and of the background map, and
   the at least one part of the background map belongs to a graphic layer separate from the specific graphic layer comprising including the at least one annotation.

4. The method according to claim 1, further comprising storing, in memory, the at least one object and the associated geographic coordinates.

5. A computer program stored on a non-transitory medium comprising instructions that when executed by a computer cause the computer to perform the method of claim 1.

6. A device for annotating an electronic background map, the background map being associated with projection parameters and geodesic parameters, and display references being associated with a display of at least part of the background map, the device, comprising:
   means for acquiring at least one annotation;
   means for displaying the at least one annotation and at least part of the background map;
   means for transforming the at least one annotation to at least one object including at least one point having geometric coordinates defined in the display system of the display means; and
   means for converting the geometric coordinates of the at least one point of the at least one object to geographic coordinates according to the projection parameters and the geodesic parameters associated with the background map and according to the display references.

7. The device according to claim 6, further comprising storage means adapted to store in memory the at least one object and the associated geographic coordinates.

8. The device according to claim 6 or claim 7, wherein the transformation means includes means for transforming the at least one object to at least one vectorial object.

9. The device according to claim 6, wherein
   the display means includes means for managing graphic layers,
   the at least one annotation belongs to a specific graphic layer of the display means, and
   the at least one part of the background map belongs to a graphic layer separate from the specific graphic layer comprising including the at least one annotation.

10. An aircraft comprising the device according to claim 6.

11. The method according to claim 1, wherein in the step of acquiring, the at least one annotation is acquired from a user viewing the displayed background map.

12. The device according to claim 6, wherein the means for acquiring acquires the at least one annotation from a user viewing the displayed background map.

13. A device for annotating an electronic background map, the background map being associated with projection parameters and geodesic parameters, and display references being associated with a display of at least part of the background map, the device comprising:
   an interface configured to acquire at least one annotation;
   a display configured to display the at least one annotation and at least part of the background map; and
   a processor configured to
      transform the at least one annotation to at least one object including at least one point having geometric coordinates defined in the display system of the display, and
      convert the geometric coordinates of the at least one point of the at least one object to geographic coordinates according to the projection parameters and the geodesic parameters associated with the background map and according to the display references.

14. The device according to claim 13, further comprising a memory configured to store the at least one object and the associated geographic coordinates.

15. The device according to claim 13, wherein the processor is configured to transform the at least one object to at least one vectorial object.

16. The device according to claim 13, wherein
   the display is configured to manage graphic layers,
   the at least one annotation belongs to a specific graphic layer of the display, and
   the at least one part of the background map belongs to a graphic layer separate from the specific graphic layer including the at least one annotation.

17. An aircraft comprising the device according to claim 13.

18. The device according to claim 13, wherein the interface is configured to acquire the at least one annotation from a user viewing the displayed background map.

* * * * *